(12) United States Patent
Aue et al.

(10) Patent No.: US 11,899,785 B2
(45) Date of Patent: Feb. 13, 2024

(54) METHOD FOR DETECTING AN UNAUTHORIZED PHYSICAL ACCESS TO A BUS SYSTEM

(71) Applicant: Robert Bosch GmbH, Stuttgart (DE)

(72) Inventors: Axel Aue, Korntal-Muenchingen (DE); Eugen Becker, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 308 days.

(21) Appl. No.: 17/450,573

(22) Filed: Oct. 12, 2021

(65) Prior Publication Data
US 2022/0147621 A1    May 12, 2022

(30) Foreign Application Priority Data
Nov. 10, 2020   (DE) .......................... 102020214099.5

(51) Int. Cl.
*G06F 21/55* (2013.01)
*G06F 7/57* (2006.01)

(52) U.S. Cl.
CPC .............. *G06F 21/552* (2013.01); *G06F 7/57* (2013.01); *G06F 2221/034* (2013.01)

(58) Field of Classification Search
CPC ........ G06F 21/552; G06F 21/70; G06F 21/75; G06F 221/034
See application file for complete search history.

(56) References Cited

U.S. PATENT DOCUMENTS

| | | | | |
|---|---|---|---|---|
| 5,226,137 A | * | 7/1993 | Bolan ...................... | G11C 7/24 711/164 |
| 9,665,870 B1 | * | 5/2017 | Rezayee ............ | G06Q 20/4012 |
| 11,709,971 B2 | * | 7/2023 | Aue ...................... | G06F 21/554 726/22 |
| 2012/0216301 A1 | * | 8/2012 | Erickson ............... | G06F 21/556 726/34 |
| 2014/0013425 A1 | * | 1/2014 | Samson ................ | G06F 21/755 726/22 |

(Continued)

FOREIGN PATENT DOCUMENTS

| | | |
|---|---|---|
| DE | 102013210182 A1 | 12/2014 |
| DE | 102017208547 A1 | 11/2018 |

(Continued)

*Primary Examiner* — Ponnoreay Pich
(74) *Attorney, Agent, or Firm* — NORTON ROSE FULBRIGHT US LLP; Gerard A. Messina

(57) ABSTRACT

A method for detecting an unauthorized physical access to a bus system. The method including: acquiring a measuring signal which assumes a first state when the voltage signal lies above a threshold voltage and a second state when the voltage signal does not; detecting a test-level sequence in the voltage signal; forming a measuring-signal pattern based on the measuring signal; comparing the measuring-signal pattern to a reference pattern that is assigned to the detected test-level sequence and was determined based on a reference measuring signal for the test-level sequence in a state of the bus system in which no unauthorized physical access was present; and determining that a possible unauthorized physical access is present if the measuring-signal pattern and the reference pattern differ from each other in one or more predetermined properties by more than a specific tolerance.

14 Claims, 3 Drawing Sheets

(56) References Cited

U.S. PATENT DOCUMENTS

| | | | |
|---|---|---|---|
| 2018/0181500 A1* | 6/2018 | Shappir | G06F 21/86 |
| 2021/0034745 A1* | 2/2021 | Ruvio | H04L 63/1425 |
| 2022/0138350 A1* | 5/2022 | Aue | G06F 21/85 |
| | | | 726/22 |
| 2022/0147621 A1* | 5/2022 | Aue | G06F 21/552 |
| 2022/0394053 A1* | 12/2022 | Sorani | G06F 21/57 |

FOREIGN PATENT DOCUMENTS

| | | |
|---|---|---|
| DE | 102018208118 A1 | 11/2019 |
| EP | 2553540 A1 | 6/2013 |
| WO | 2011120823 A1 | 6/2011 |
| WO | WO-2022093180 A1 * | 5/2022 |

* cited by examiner

METHOD FOR DETECTING AN UNAUTHORIZED PHYSICAL ACCESS TO A BUS SYSTEM

CROSS REFERENCE

The present application claims the benefit under 35 U.S.C. 119 of German Patent Application No. DE 102020214099.5 filed on Nov. 10, 2020, which is expressly incorporated herein by reference in its entirety.

FIELD

The present invention relates to a method for detecting an unauthorized physical access to a bus system, as well as an arithmetic-logic unit and a computer program for its implementation.

BACKGROUND INFORMATION

Programmable control units are used in machines and motor vehicles in order to control them or components thereof. For example, a motor vehicle may contain control units for the engine management, for the brake system, etc. The control units include a microcontroller or processor having one or typically several processor cores which execute programs stored in a memory in order to achieve the functions of the control unit.

The control units may be connected to each other and to further devices, e.g., sensors, via a bus. For example, the CAN (Controller Area Network) bus is widespread, a bus based on differential voltages which transmits data or messages via two bus lines; bus lines and bus users together form a bus system. In order to prevent an attacker which has access to the physical layer, particularly the bus lines, from manipulating the transmitted data or implanting its own data, the data to be transmitted may be encrypted.

However, an attacker should be prevented from gaining access to the physical layer in spite of the encryption, since on one hand, the attacker may eavesdrop on data transmissions and, given a large number of data transmissions, possibly break the encryption, and on the other hand, the attacker may inundate the bus with messages and thus may impair the functioning of the bus system. The latter represents a particular danger in the case of the CAN bus, since in the CAN bus, each message has a specific priority which is specified by the sender and according to which the bus bandwidth is used, that is, only the message having the highest priority is transmitted at any one time. Thus, the attacker could bring the data transmission between control units to a standstill by flooding the bus with messages of high priority.

German Patent Application Nos. DE 10 2017 208 547 A1 and DE 10 2018 208 118 A1 describe methods according to which characteristics, perhaps signal edges, of a transmission of a message via a network are evaluated, the origin of the message being determined or the message being authenticated based on the characteristics.

SUMMARY

According to the present invention, a method is provided for detecting an unauthorized physical access to a bus system, as well as an arithmetic-logic unit and a computer program for its implementation. Advantageous refinements and embodiments of the present invention are disclosed herein.

For a test-level sequence detected in the voltage signal of the bus, according to an example embodiment of the present invention, a measuring-signal pattern is compared to a corresponding reference pattern, in doing so, specific properties being checked for deviations outside of certain tolerances. The measuring-signal pattern is formed from a measuring signal which is acquired, for example, by a comparator comparing the voltage signal to the threshold voltage, and the measuring signal having a first state and a second state accordingly. At the very least, the measuring-signal pattern and the reference pattern indicate transitions between the two states and their points in time during a period of time corresponding to the test-level sequence, the reference pattern being formed from a corresponding reference measuring signal which is acquired during a state of the bus system in which it is ensured that no unauthorized access is present.

By using a threshold voltage, which generally differs from the voltage levels that are used according to the bus specification for the data transmission and which in particular lies between the voltage levels used by the bus for the data transmission, disturbances in the voltage signal that are caused by the design of the bus system, e.g., voltage oscillations after an edge in the voltage signal, are able to be detected within one signal-level sequence and utilized for the comparison. This is advantageous, since these disturbances change depending on the specific design of a bus system. They are characteristic for the individual bus system and cannot be foreseen by an attacker. Attacks on the physical layer of the bus system, for example, by an attacker connecting a device to the bus line with the aid of mechanical contacting, are thus detected more easily utilizing the present invention.

According to one preferred embodiment of the present invention, the threshold voltage is changed, that is, is alterable or predefinable by software, for example. It goes without saying that after a change, the corresponding reference pattern should be redetermined. Changing the threshold voltage allows a selection of suitable reference patterns, so that the accesses of all bus users are classified as authorized, particularly when the bus system is changed, e.g., when a new bus user is connected.

The term "signal-level sequence" is intended to denote a specific sequence of levels in the voltage signal, which encodes data or bus-control signals in accordance with the bus specification. Thus, according to the bus specification, a specific meaning may be assigned to a signal-level sequence, e.g., one bit having a specific value or several bits having specific values; it may also be a matter of bus-control signals, for instance, a signal-level sequence which signals the end of a message. Whether and which signal-level sequence is present may generally only be ascertained with the completion of the signal-level sequence. In principle, a signal-level sequence is recognized based on its meaning or specification according to the bus specification.

From among these signal-level sequences, at least one signal-level sequence is selected which is used in the method to check whether possibly an unauthorized physical access to the bus system, more precisely to the physical layer, is present. This signal-level sequence is referred to as "test-level sequence"; advantageously, it involves signal-level sequences utilized during normal communication. Namely, a suitable test-level sequence may already occur during the transmission of a single bit.

The "measuring-signal pattern" and the "reference pattern" correspond to the measuring signal and reference measuring signal, respectively, during the period of time which is assigned to the test-level sequence, for instance, from an initial edge up to a terminating edge of one bit in the voltage signal (see FIGS. 2A, 2B for an example). That is, a pattern or a structuring of the (reference) measuring signal is formed during this period of time. The "measuring-signal pattern" and "reference pattern" may be available and stored in the form of a time series of the measuring signal and reference measuring signal, respectively. However, since the (reference) measuring signal jumps back and forth between only two states, it is characterized uniquely by the points in time of the transitions between the two states and indication of the direction of the transitions. Accordingly, the "measuring-signal pattern" and the "reference pattern" may preferably be available and stored in the form of a list of the transitions, which includes the points in time and optionally the direction of the transitions, which is more efficient than the storing of time series. An indication of the direction of the transitions may potentially be omitted (depending upon which properties are checked during the comparison), since successive transitions have different directions, and directions are already known from the signal-level sequence.

The tolerances may be indicated as a relative measure, for example, that a time interval between two transitions in the measuring-signal pattern is allowed to deviate by a maximum of a certain percentage (e.g., 10%) from the corresponding time interval in the reference pattern. Likewise, absolute specifications may be indicated, for example, a certain permissible deviation may be specified in nanoseconds or picoseconds. For each test-level sequence, generally a separate tolerance is indicated for each property. The tolerances ensure that small disturbances do not lead to a possible unauthorized physical access being determined mistakenly.

In accordance with an example embodiment of the present invention, preferably, the measuring signal is formed with the aid of a comparator. This has the advantages that it is easy to realize in terms of circuit engineering and permits high speed.

In addition, preferably a timer module is used to record the points in time of the transitions. This makes it possible to determine the points in time with high time resolution.

Moreover, the measuring-signal pattern and, for each test-level sequence, the assigned reference pattern preferably indicates the direction of the transitions. By indicating the directions, certain structures in the measuring-signal pattern such as oscillation valleys or peaks are able to be recognized and checked during the comparison.

For each test-level sequence, preferably the assigned reference pattern includes at least four transitions. This may be achieved by suitable selection or by altering the threshold voltage, so that as a result, the reference patterns determined have the corresponding number of transitions. Since each signal-level sequence typically includes one initial and one final transition, which defines the period of time of the signal-level sequence, transitions may thus be checked which are not included as such in the definition of the signal-level sequence, e.g., disturbances or oscillations caused by the bus system.

The one or more predetermined properties are selected from: a number of transitions; at least one time interval between specific transitions; at least one quotient of two time intervals between specific transitions; and a position of one predetermined transition, e.g., the last transition prior to a stable signal phase. For example, the transitions in the patterns may be determined according to at least one numbering starting from the first transition and/or from the last transition. The direction of the transitions may also be taken into account, for instance, separate numberings for rising transitions (i.e., from the first to the second state) and falling transitions (i.e., from the second to the first state). Since it is inherent in the design that rising and falling transitions always occur in alternation, and normally a first (either rising or falling) transition is predetermined by the data structure, typically a numbering starting from the first transition is sufficient to clearly identify each transition including direction.

In accordance with an example embodiment of the present invention, preferably, the method includes a determination that an unauthorized physical access is present when a message transmitted on the bus system includes multiple test-level sequences, and a possible unauthorized physical access is ascertained for a preset minimum number of these test-level sequences. Random disturbances, which are not caused by the bus system but which may lead to the determination of deviations during the comparison of the patterns, may thus be prevented from leading immediately to the assumption of an unauthorized access.

For at least one test-level sequence, the method preferably includes: Determining the reference pattern assigned to the test-level sequence, in doing so, a voltage signal being generated which includes the test-level sequence; the reference measuring signal, which assumes the first state when the voltage signal lies above the threshold voltage and assumes the second state when the voltage signal does not lie above the threshold voltage, in particular being formed, if given, with the aid of the comparator; and the reference pattern assigned to the test-level sequence being determined based on the reference measuring signal. Thus, in principle, the reference pattern is determined the same way as the measuring-signal pattern, the only difference being that in this case, a reference measuring signal is used which is obtained from a voltage signal (reference-voltage signal) that is present in an un-manipulated state, that is, a state in which no unauthorized physical access is present, e.g., when manufacturing the bus system or the device (motor vehicle, machine) in which it is included.

In addition, preferably the threshold voltage is changed or adjusted prior to determining the reference pattern assigned to the respective test-level sequence, more preferably the change being carried out randomly within a predetermined threshold-voltage range. During series production, for instance during auto manufacturing, a high number of bus systems is produced which have identical or at least very similar electrical properties. If the threshold voltage is the same, this can lead to a large number of (approximately) identical reference patterns, so that an attacker which, undetected by the manipulation detection method, succeeds in gaining access to one of these bus systems, potentially gains access to a large number of identically constructed bus systems. If, in various of these bus systems, the reference patterns are determined with different threshold voltages, the reference patterns are able to be varied between the bus systems. In each of these bus systems, the method for detecting a manipulation attempt must then naturally use the threshold voltages with which the reference patterns were determined. More preferably, in each case, the threshold voltage is altered randomly within a certain range.

Moreover, for at least one test-level sequence, the method preferably includes determining the tolerance for at least one of the properties checked during the comparison, in doing so, each user of the bus system one after the other generating a voltage signal in accordance with the test-level sequence, in each case the measuring signal being acquired for each bus user, based on which the measuring-signal pattern is formed, and a bus-user-specific deviation of the formed measuring-signal pattern from the reference pattern assigned to the test-level sequence being determined; the tolerance being defined in such a way that the bus-user-specific deviations lie within the tolerance, more preferably, the tolerance being defined in such a way that the tolerance is the smallest tolerance allowing the bus-user-specific deviations to lie within the tolerance. In this way, it is ensured that a message of a bus user is not mistakenly recognized as manipulation of the bus system, that is, determined to be an unauthorized physical access.

An arithmetic-logic unit according to an example embodiment of the present invention, e.g., a control unit of a motor vehicle, includes a comparator and is equipped, especially in terms of program engineering, to carry out a method of the present invention. The comparator is furnished to compare the voltage signal to the threshold voltage and to form the measuring signal.

The implementation of a method according to the present invention in the form of a computer program or computer-program product having program code for carrying out all method steps is also advantageous, since the costs it entails are particularly low, especially if an executing control unit is also being used for other tasks and is therefore present in any case. Suitable data carriers for providing the computer program are, namely, magnetic, optical and electrical memories like, e.g., hard disks, flash memories, EEPROMs and DVDs, among others. Download of a program via computer networks (Internet, intranet, etc.) is also possible.

Further advantages and refinements of the present invention are derived from the description and the figures.

The present invention is represented schematically in the figures on the basis of exemplary embodiments, and is described in the following with reference to the figures.

DETAILED DESCRIPTION OF EXAMPLE EMBODIMENTS

Figure 1:
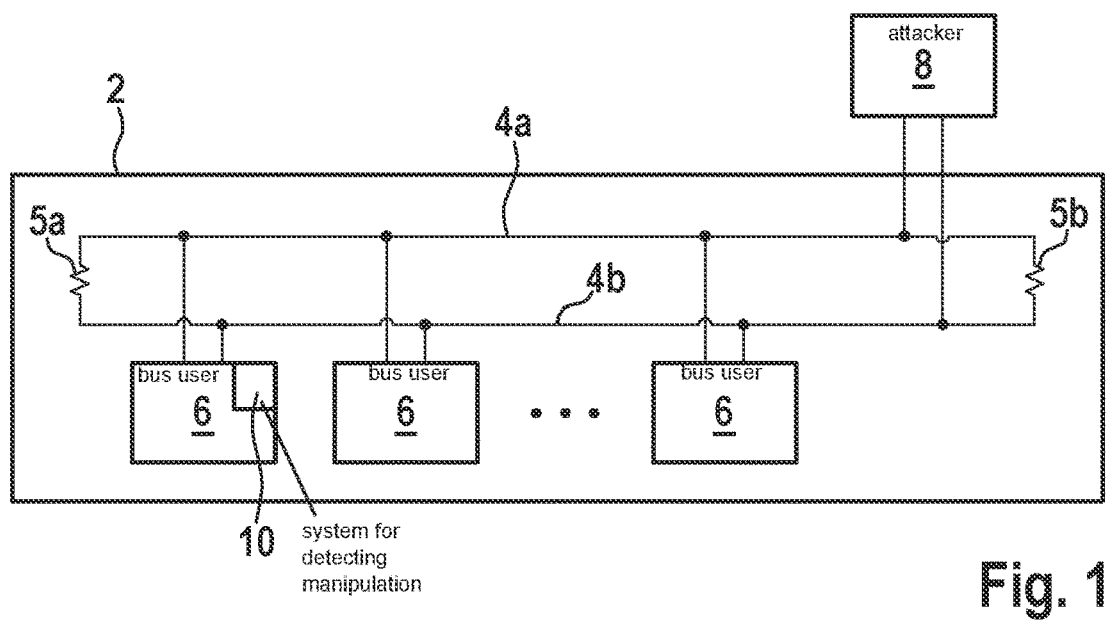
FIG. 1 shows an exemplary design of a bus system, and an attacker.

FIG. 1 shows an exemplary design of a bus system 2, particularly a bus system based on differential-voltage signals such as a CAN bus system, for instance, and an attacker 8. On one hand, bus system 2 includes lines 4a, 4b via which the voltage signals are transmitted and which are connected to each other via terminating resistors 5a, 5b that represent the central impedance of the bus system, and on the other hand includes a plurality of bus users 6 that are connected to the two bus lines 4a, 4b in order to communicate with each other via the bus. To that end, the bus users utilize differential voltages between the two bus lines, which are generated and read out with the aid of transceivers. Examples for bus users 6 are control units of a motor vehicle or of a machine which transmit control data, or are sensors which transmit sensor data to control units, for instance. One of the bus users includes a system 10 for detecting manipulation, which is explained in greater detail in connection with FIG. 3. In this patent application, the term bus user denotes regular bus users for which access to the bus is authorized, in contrast to an attacker which accesses the bus without authorization.

Attacker 8, say a device which likewise has a transceiver or at least a transmitter or receiver, e.g., a so-called OBD plug, has physical access to the bus system and is thus able to connect to lines 4a 4b. Consequently, attacker 8 is able to eavesdrop on messages transmitted over the bus and/or to send messages itself.

Figure 2A:
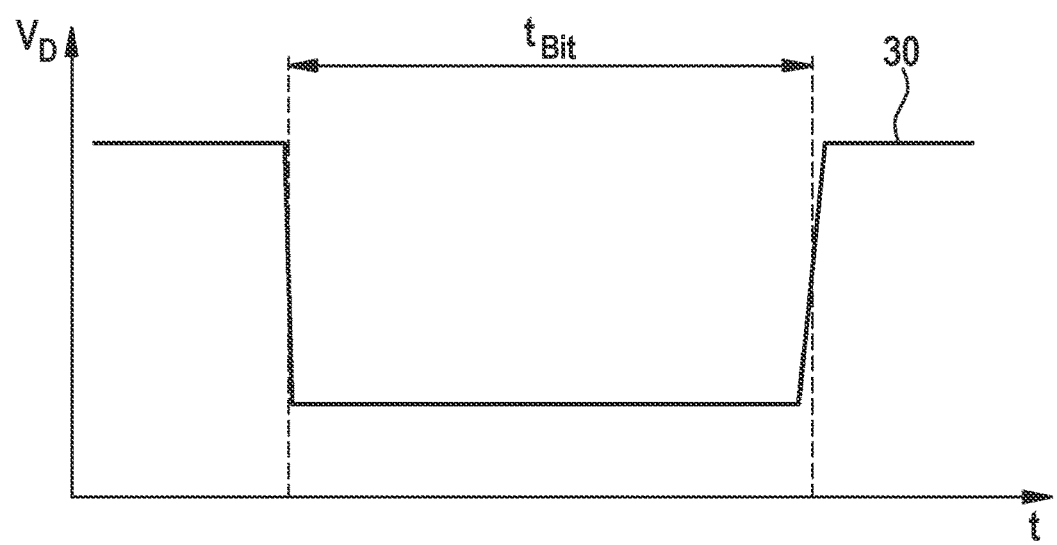
FIGS. 2A and 2B show an ideal voltage characteristic for transmitting one bit having the value 1 and the corresponding actual voltage characteristic.
Figure 2B:
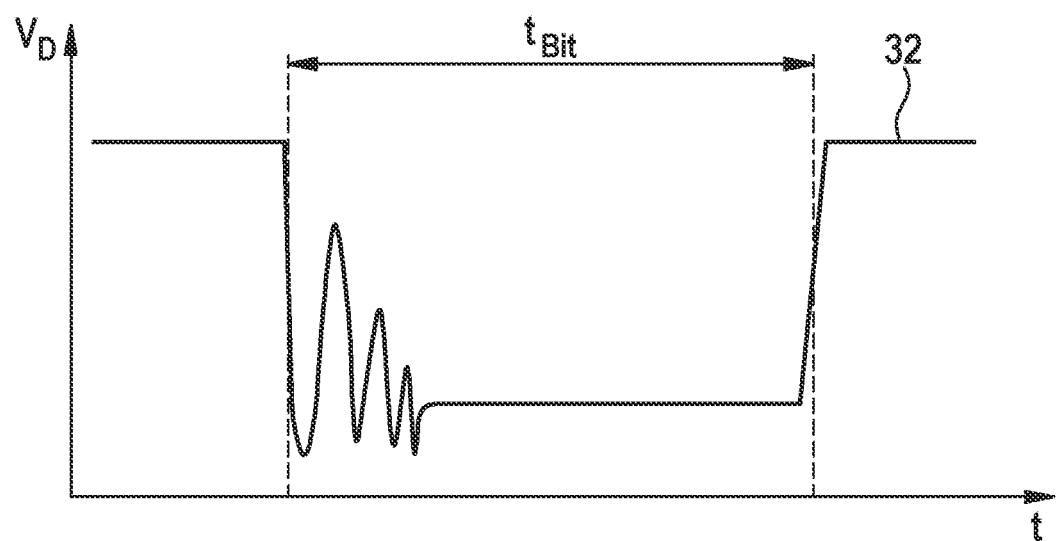

FIGS. 2A and 2B show an ideal differential-voltage characteristic 30, for instance, according to the CAN bus specification, which is used to transmit one bit having a specific logical value, and a corresponding actual differential-voltage characteristic 32. In each case, differential voltage $V_D$ is plotted against time t.

In ideal differential-voltage characteristic 30 (FIG. 2A), which is produced by the sender, initially a relatively high differential voltage is present (in the CAN bus at least 2 V, so-called "dominant state"), which then transitions via a falling edge into a low differential voltage (in the CAN bus 0 V, so-called "recessive state"), to subsequently transition again via a rising edge into the high differential voltage. Such a signal-level sequence is used in the CAN bus to transmit one bit having the logical value 1, when the time span between falling and rising edge amounts to a time span $t_{Bit}$ predetermined according to the CAN bus-system specification.

However, the physical layer, that is, bus lines 4a, 4b together with bus users 6, has electrical properties, particularly inductances and capacitances, which interfere with this idealized differential-voltage characteristic. This leads to disturbances such as changes in the steepness of the edges, reflections, oscillations in the voltage characteristic and the like. These disturbances are a function of the precise realization of the physical layer, i.e., the design of an actual bus system (e.g., the length of the lines, the number of users and where they are connected to the lines, electrical properties of the transceivers of the users, etc.). Such an actual differential-voltage characteristic 32 is shown by way of example in FIG. 2B. Here, after the falling edge, oscillations appear in the differential voltage which are also referred to as "ringing".

Since the disturbances are dependent on the design of the bus system, they are characteristic for the specific concrete bus system. If a further user or, as in FIG. 1, an attacker 8 becomes connected to the bus system, this leads to a change in the disturbances, so that a possible manipulation attempt is able to be detected.

Figure 3:
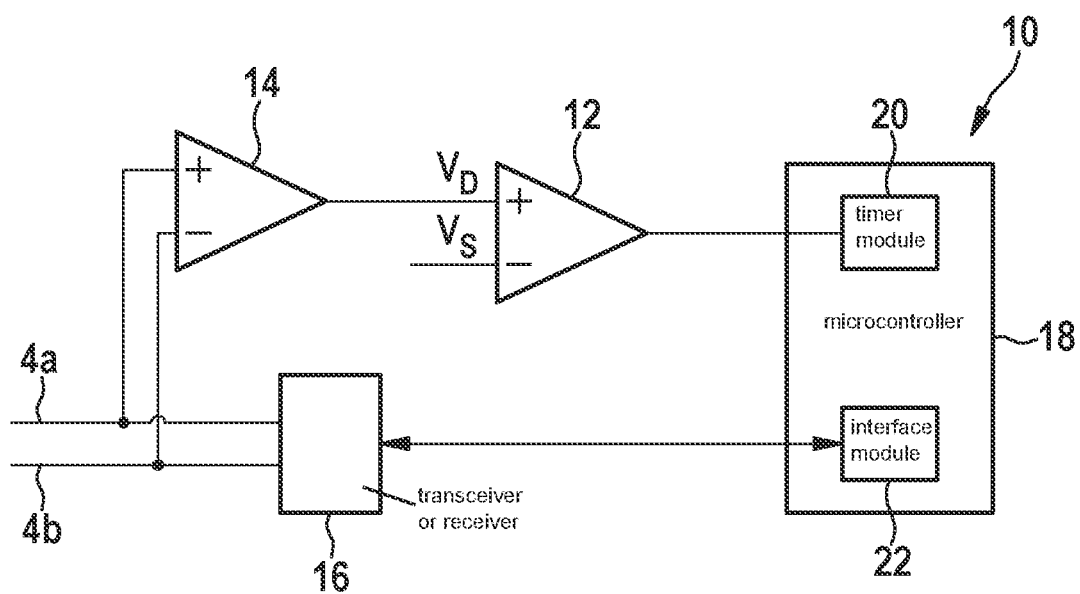
FIG. 3 shows a system for detecting an unauthorized physical access according to one preferred specific embodiment of the present invention.

FIG. 3 shows a system 10 which may be used according to the present invention to detect a manipulation attempt on the physical layer of the bus system. The system may be included in an already existing bus user 6, that is, a bus user which performs other tasks, or may form a stand-alone bus user that is provided specifically to detect manipulation.

Provided in the system is a comparator 12 which compares the voltage signal (with which data are transmitted) to a threshold voltage $V_S$. For example, the voltage signal here is differential voltage $V_D$ between the two lines 4a, 4b of a CAN bus system. For example, the differential voltage may be obtained with the aid of a differential amplifier 14—which determines the difference between two input signals—from the voltages applied to bus lines 4a, 4b. For buses that do not use differential voltages, the system must obviously be adapted accordingly in order to obtain the voltage signal, which is the input signal for comparator 12. Alternatively (not shown), the voltage signal or differential voltage may also be obtained from a transceiver or receiver 16.

Comparator 12 generates a measuring signal which indicates whether voltage signal $V_D$ lies above or below threshold voltage $V_S$. Namely, the measuring signal may assume a first state, e.g., a first measuring-signal voltage, when the voltage signal lies above a certain threshold voltage, and a second state, e.g., a second measuring-signal voltage, when the voltage signal does not lie above the threshold voltage.

The measuring signal is transmitted by comparator 12 to a microcontroller 18 which is furnished to acquire and interpret the measuring signal. In this context, microcontroller 18 determines the points in time of transitions between the first and second state of the measuring signal and the direction of the transitions (first after second state and second after first state, respectively). For this purpose, preferably a timer module 20 (included in the microcontroller) is used, which permits a high-resolution time measurement in the picosecond range. A time resolution of the points in time of the transitions amounts preferably to at least 5 nanoseconds, more preferably at least 100 picoseconds, even more preferably at least 20 picoseconds, most preferably at least 5 picoseconds. Suitable timer modules are described in European Patent No. EP 2 553 540 B1, for example.

Data are transmitted via transceiver 16, for example, which on one hand, converts received data into signals suitable for processing by microcontroller 18 and transmits them to it, or rather, to an interface module 22 there, e.g., a CAN module, and on the other hand, receives data to be transmitted or corresponding signals from interface module 22 and from them, generates voltages on bus lines 4a, 4b which correspond to these data in accordance with the bus specification. Alternatively, instead of a special interface module, a generic module as described, for instance, in German Patent Application No. DE 10 2013 210 182 A1, e.g., likewise timer module 20, may be used.

In this context, specific signal-level sequences correspond to specific data, e.g., one bit which has logical value 1 (see, for instance, FIG. 2A). Thus, one specific meaning corresponds to specific signal-level sequences (in general, there may be several, which also include several bits, for example), that is, specific data or bus-control signals may be assigned to them by the microcontroller or the transceiver; this correspondence is determined by the bus specification.

Some or all of the signal-level sequences in the voltage signal known according to the bus specification may be utilized as test-level sequences. For each of these test-level sequences, when the bus system is an unmanipulated state, a reference pattern is determined from the associated reference measuring signal obtained by the comparator, the reference pattern including the points in time of the transitions and their direction in the voltage signal during the test-level sequence. Thus, a reference pattern is assigned to each test-level sequence.

If a test-level sequence is detected in the voltage signal, e.g., on the basis of the data transmitted, then using the comparator and from the measuring signal obtained by it, a corresponding measuring-signal pattern may be obtained that may be compared to the reference pattern (obviously the threshold voltage when acquiring the measuring signal should be the same as when acquiring the reference measuring signal). If, given a suitably selected threshold voltage, deviations are ascertained, then a possible manipulation attempt is present, since the electrical disturbances and therefore the points in time of the transitions may change due to the attacker connected to the bus system.

Figure 4A:
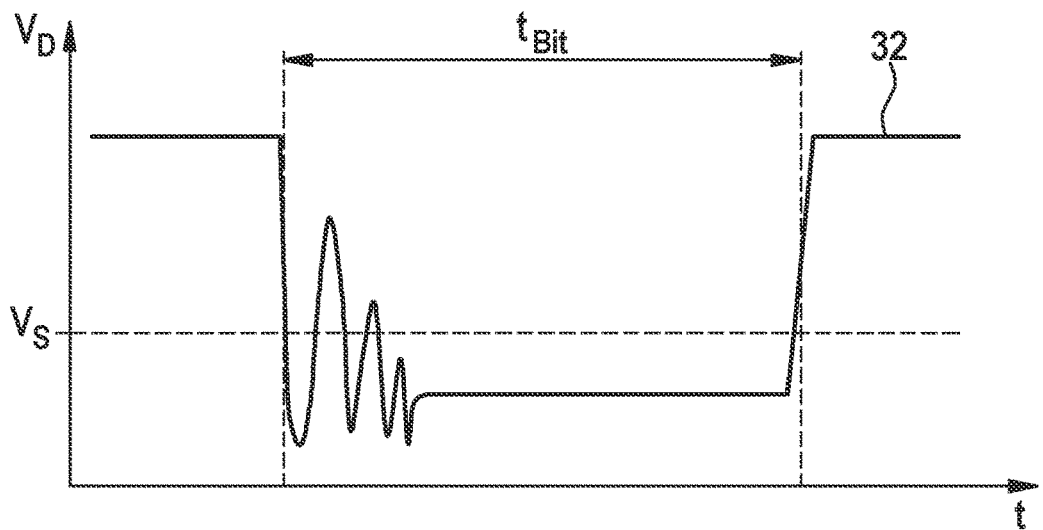
FIGS. 4A and 4B show an actual voltage characteristic for transmitting one bit having the value 1 and a corresponding measuring signal acquired according to an example embodiment of the present invention.
Figure 4B:
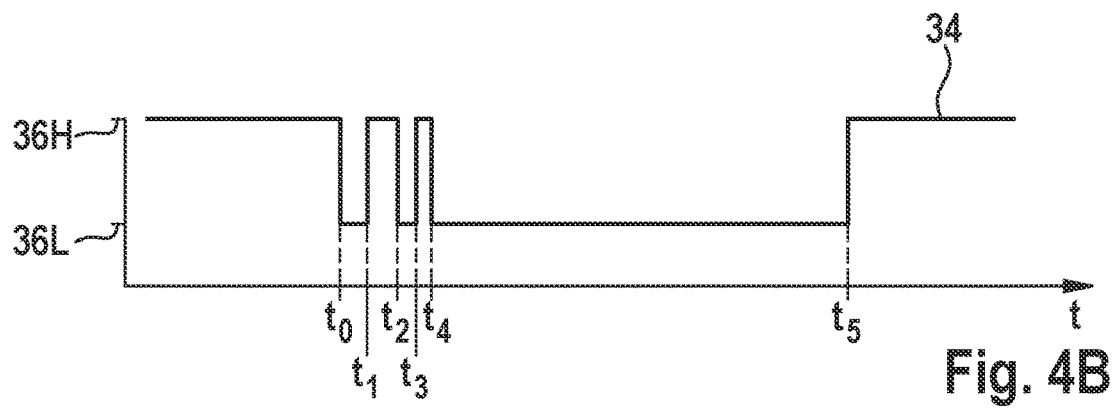

The determination of the measuring signal for the voltage signal of FIG. 2B is shown by way of example in FIGS. 4A, 4B. FIG. 4A once again shows actual voltage signal 32, with the level of threshold voltage $V_S$ additionally being plotted. Threshold voltage $V_S$ is selected so that it lies between a highest and a lowest voltage of the voltage signal. FIG. 4B shows resulting measuring signal 34, which is a succession of high/low states, high state 36H being present when the voltage signal lies above the threshold voltage, and low state 36L being present when the voltage signal does not lie above the threshold voltage. This measuring signal or the measuring-signal pattern resulting from it corresponds to one bit having logical value 1 and may be compared to the reference pattern which corresponds to one bit having logical value 1.

The measuring signal in FIG. 4B includes transitions between the first and second state, which take place at points in time $t_0, t_1, \ldots V_5$. The points in time may all be indicated relative to one reference point in time, for instance $t_0$, which represents the beginning of the signal-level sequence, since the absolute time at which the data—here one bit—are transmitted is irrelevant. In principle, these points in time represent a measuring-signal pattern that is compared to the corresponding reference pattern, that is, the corresponding points in time of the reference pattern. Values calculated from the points in time may also be used in the comparison. For the reference pattern, preferably all values used in the comparison are already calculated in advance and stored (e.g., in a memory which the microcontroller is able to access), so that they do not have to be calculated again.

Various properties may be taken into account in the comparison. A first is the number of transitions (here 6). This number may change in response to stronger or weaker attenuation of the oscillation by an added attacker.

Another property involves time intervals or periods of time between points in time corresponding to each other in the measuring-signal pattern and reference pattern, that is, the difference between two points in time. For instance, difference $t_5-t_0$ may be calculated between last point in time $t_5$ and first point in time $t_0$, which represents a total time of the signal-level sequence (here, let us say, equal to $t_{Bit}$). Further possible time states are the durations of the oscillation peaks and/or oscillation valleys in the voltage signal, that is, the time difference $t_i-t_{i-1}$ between two successive points in time (here: oscillation peaks: $t_2-t_1$, $t_4-t_3$; oscillation valleys: $t_1-t_0$, $t_3-t_2$). In the same way, for example, the time difference between two successive rising edges (here: $t_3-t_1$) or two successive falling edges (here: $t_4-t_2$) may be calculated and compared (these differences are a measure for the period or frequency of the oscillation, which is influenced by a change of the inductance or capacitance in the bus system).

A further possibility is the consideration of quotients of time intervals. Here, four or three (if two points in time coincide) different points in time go into the calculation. For example, in the case of an oscillation structure as in FIG. 4, the durations of the two oscillation peaks could be placed in relation to each other $(t_2-t_1)/(t_4-t_3)$. Or, the quotient $(t_3-t_2)/(t_2-t_1)$ of the durations of one oscillation valley and one oscillation peak could be calculated. Oscillation valleys and oscillation peaks are characterized clearly by the sequence of rising and falling transitions, i.e., the direction. It is possible to calculate further properties, not named, from the points in time and the directions of the transitions.

Another possibility is to determine the position of one predetermined transition, e.g., the last transition prior to a stable signal phase, i.e., the end of an initial signal oscillation. By evaluation of the pattern in terms of when a stable signal is present, and comparison to a reference pattern which was stored as reference prior to delivery of the vehicle from the manufacturer, for example, it is possible to detect an unauthorized physical access. For instance, if upon delivery, the signal is stable after 10 samples and this deviates by more than 5 samples during the measurement, an unauthorized physical access is able to be detected.

Figure 5:
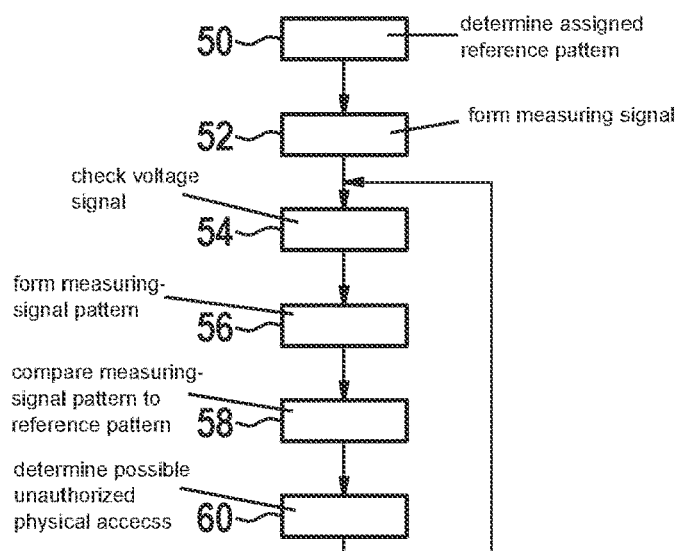
FIG. 5 shows a flowchart according to one preferred specific embodiment of the method according to the present invention.

FIG. 5 shows a flowchart according to one preferred specific embodiment of the method according to the present invention.

In optional step 50, first of all the assigned reference pattern is determined for at least one test-level sequence. To that end—for each test-level sequence—a voltage signal, that is, a reference-voltage signal, in which the test-level sequence appears, is generated, for instance, by a bus user. From it, a reference measuring signal is formed (particularly by a comparator) based on which the reference pattern is determined in a period of time corresponding to the test-level sequence. In determining the reference pattern, the procedure is similar to the formation of the measuring-signal pattern, with the difference that it is carried out based on the reference measuring signal which is obtained from the reference voltage signal. The reference pattern(s) is/are stored in a memory, for example, which the microcontroller of FIG. 3 is able to access. Step 50 (if the microcontroller is connected to a transmitter or transceiver) and the further steps may be carried out by this microcontroller and the comparator connected to it. Step 50 should be carried out one time prior to the further steps, which are carried out repeatedly during the regular operation of the bus system. It is also possible that the reference patterns may already be preset; step 50 may then be omitted (for instance, in the case of multiple identically constructed bus systems).

The determination of at least one reference pattern which is assigned to the test-level sequence may include a change of the threshold voltage, so that suitable reference patterns are obtained, that is, reference patterns which, on one hand, do not classify test-level sequences transmitted by bus users as unauthorized accesses, and on the other hand, characterize the corresponding voltage signal sufficiently narrowly to permit detection of attackers. This determination of at least one reference pattern may likewise include a definition of the tolerances.

In step 52, the measuring signal is formed, which records whether the voltage signal lies above the threshold value or does not lie above the threshold value. Preferably, the measuring signal is formed with the aid of a comparator. The voltage signal here is that with which data are transmitted over the bus during the operation. The measuring signal assumes two states, depending on whether the voltage signal does or does not lie above the threshold value.

The voltage signal is thereupon checked as to whether a test-level sequence is occurring, that is, which is detected in the voltage signal, step 54. The test-level sequence extends over a certain period of time in the voltage signal.

If the test-level sequence was detected, in step 56, a measuring-signal pattern is formed which is based on the measuring signal during the period of time corresponding to the test-level sequence (the period of time over which the test-level sequence extends). The measuring-signal pattern is formed so that, just like the reference pattern determined in step 50, it indicates at least the points in time of transitions between the two states in the measuring signal.

In step 58, the measuring-signal pattern is compared to the reference pattern, during the comparison it being checked whether certain properties of the two patterns are the same or different. If it is ascertained during the comparison that in one or more predetermined properties, the measuring-signal pattern and the reference pattern differ from each other by more than a specific tolerance, then in step 60, a possible unauthorized physical access is determined. If it is ascertained that the measuring-signal pattern and reference pattern do not differ within the tolerances, then in step 60, it is assumed that no unauthorized physical access is present. In this case, it is possible to jump back again to step 54 (detection of a test-level sequence), and the method may be repeated from there for further test-level sequences.

If an unauthorized physical access is determined, suitable actions may be taken, for example, the message in which the questionable test-level sequence was contained may be discarded. In addition, a warning may be sent in which perhaps an operator or another device is cautioned that the bus system is possibly being accessed in unauthorized manner. For example, the bus system may then be further analyzed by an expert, for instance, may be examined to ascertain whether structural changes (connection of an attacker to the bus) were made.

What is claimed is:

1. A method for detecting an unauthorized physical access to a bus system, in which data are transmitted according to a bus specification utilizing signal-level sequences in a voltage signal, comprising the following steps:
  acquiring a measuring signal which assumes a first state when the voltage signal lies above a threshold voltage, and assumes a second state when the voltage signal does not lie above the threshold voltage;
  detecting a test-level sequence in the voltage signal;
  forming a measuring-signal pattern based on the measuring signal during a period of time corresponding to the test-level sequence;
  comparing the measuring-signal pattern to a reference pattern that is assigned to the detected test-level sequence and was determined based on a reference measuring signal for the test-level sequence in a state of the bus system in which no unauthorized physical access was present, the measuring-signal pattern and the reference pattern assigned to the test-level sequence indicating at least points in time of transitions between the first and the second state in the measuring signal and reference measuring signal, respectively; and
  determining that a possible unauthorized physical access is present based on the comparison ascertaining that the measuring-signal pattern and the assigned reference pattern differ from each other in one or more predetermined properties by more than a specific tolerance.

2. The method as recited in claim 1, wherein the measuring-signal pattern and the reference pattern additionally indicate a direction of the transitions.

3. The method as recited in claim 1, wherein the reference pattern includes at least four transitions.

4. The method as recited in claim 1, wherein the one or more predetermined properties are selected from:
  a number of transitions;
  at least one time interval between specific transitions;
  at least one quotient of two time intervals between specific transitions;
  a position of one specific transition.

5. The method as recited in claim 1, further comprising:
determining that an unauthorized physical access is present when a message transmitted on the bus system includes multiple test-level sequences and a possible unauthorized physical access is ascertained for a predetermined minimum number of the test-level sequences.

6. The method as recited in claim 1, further comprising for at least one test-level sequence:
determining the reference pattern assigned to the test-level sequence, in doing so, the voltage signal being generated which includes the test-level sequence, the reference measuring signal being formed which assumes the first state when the voltage signal lies above the threshold voltage and assumes the second state when the voltage signal does not lie above the threshold voltage; and the reference pattern assigned to the test-level sequence being determined based on the reference measuring signal.

7. The method as recited in claim 6, wherein the threshold voltage is changed prior to determining the reference pattern assigned to the test-level sequence, the change being carried out randomly within a predetermined threshold-voltage range.

8. The method as recited in claim 1, further comprising for at least one test-level sequence:
determining the tolerance for at least one of the properties checked during the comparison, in doing so, each bus user of the bus system one after the other generating a respective voltage signal in accordance with the test-level sequence;
wherein for each bus user, in each case the measuring signal being acquired, based on which the measuring-signal pattern is formed, and a bus-user-specific deviation of the formed measuring-signal pattern from the reference pattern, which is assigned to the test-level sequence, being determined, the tolerance being defined in such a way that the bus-user-specific deviations lie within the tolerance.

9. The method as recited in claim 8, wherein the tolerance is defined in such a way that it is a smallest tolerance allowing the bus-user-specific deviations to lie within the tolerance.

10. The method as recited in claim 1, wherein the measuring signal is formed using a comparator.

11. The method as recited in claim 1, wherein a timer module is used to record the points in time of the transitions.

12. An arithmetic-logic unit configured to detect an unauthorized physical access to a bus system, in which data are transmitted according to a bus specification utilizing signal-level sequences in a voltage signal, the arithmetic-logic unit configured to:
acquire a measuring signal which assumes a first state when the voltage signal lies above a threshold voltage, and assumes a second state when the voltage signal does not lie above the threshold voltage;
detect a test-level sequence in the voltage signal;
form a measuring-signal pattern based on the measuring signal during a period of time corresponding to the test-level sequence;
compare the measuring-signal pattern to a reference pattern that is assigned to the detected test-level sequence and was determined based on a reference measuring signal for the test-level sequence in a state of the bus system in which no unauthorized physical access was present, the measuring-signal pattern and the reference pattern assigned to the test-level sequence indicating at least points in time of transitions between the first and the second state in the measuring signal and the reference measuring signal, respectively; and
determine that a possible unauthorized physical access is present based on the comparison ascertaining that the measuring-signal pattern and the reference pattern differ from each other in one or more predetermined properties by more than a specific tolerance.

13. The arithmetic-logic unit as recited in claim 12, wherein the arithmetic-logic unit includes a comparator or is connected to a comparator.

14. A non-transitory machine-readable storage medium on which is stored a computer program for detecting an unauthorized physical access to a bus system, in which data are transmitted according to a bus specification utilizing signal-level sequences in a voltage signal, the computer program, when executed by an arithmetic-logic unit, causing the arithmetic-logic unit to perform the following steps:
acquiring a measuring signal which assumes a first state when the voltage signal lies above a threshold voltage, and assumes a second state when the voltage signal does not lie above the threshold voltage;
detecting a test-level sequence in the voltage signal;
forming a measuring-signal pattern based on the measuring signal during a period of time corresponding to the test-level sequence;
comparing the measuring-signal pattern to a reference pattern that is assigned to the detected test-level sequence and was determined based on a reference measuring signal for the test-level sequence in a state of the bus system in which no unauthorized physical access was present, the measuring-signal pattern and the reference pattern assigned to the test-level sequence indicating at least points in time of transitions between the first and the second state in the measuring signal and reference measuring signal, respectively; and
determining that a possible unauthorized physical access is present based on the comparison ascertaining that the measuring-signal pattern and the assigned reference pattern differ from each other in one or more predetermined properties by more than a specific tolerance.

* * * * *